June 11, 1940.                M. O. WILLIAMS                2,203,761
              BAFFLE FOR LIGHT SENSITIVE CONTROL APPARATUS
                         Filed Jan. 29, 1938
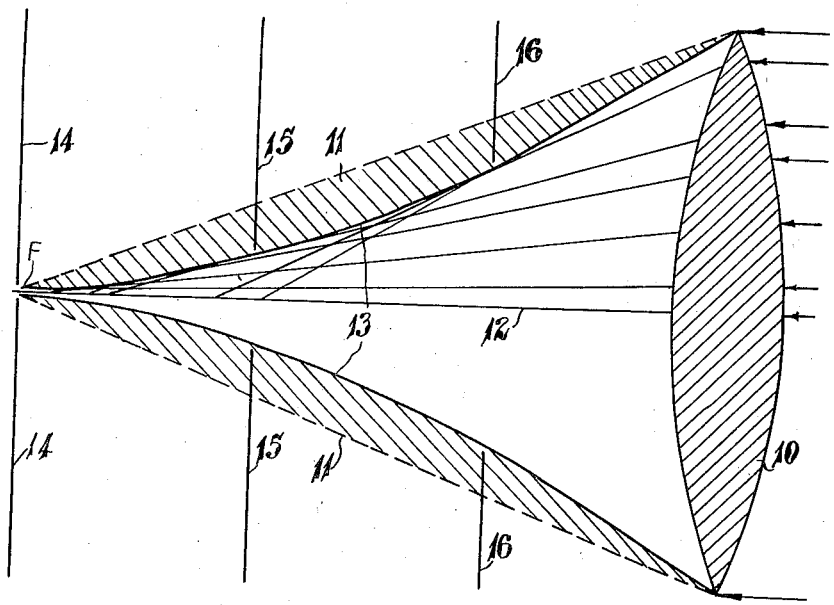
INVENTOR
MERREL OMER WILLIAMS
ATTY.

Patented June 11, 1940

2,203,761

UNITED STATES PATENT OFFICE 2,203,761

BAFFLE FOR LIGHT SENSITIVE CONTROL APPARATUS

Merrel Omer Williams, Liverpool, England, assignor to Automatic Telephone & Electric Company, London, England, a British company Application January 29, 1938, Serial No. 187,630
In Great Britain February 20, 1937

1 Claim. (Cl. 250—41.5)

The present invention relates to light sensitive control apparatus and is more particularly concerned with apparatus adapted to detect the presence of moving objects such as finds application for instance in traffic control systems of the traffic-actuated type.

The usual arrangement adopted in such systems is to project a parallel beam of light horizontally across the roadway at a suitable height and at the other side to concentrate it on to a photo-electric cell by means of a suitable lens. Interruption of the beam of light by a passing vehicle removes the stimulus from the cell and causes it to extend a signal to the traffic controller.

In order to block out stray light which would effect the operation of the photo-cell, one method adopted was to interpose at the point of focus of the light beam a diaphragm provided with a suitable aperture, so that only the focussed light beam could pass through to the cell. A single baffle is however not sufficiently selective since with the use of a simple lens of convenient focal length, which will enable the lens and cell to be accommodated in a housing of small dimensions, a parallel beam of light is not focussed to anything approaching a mathematical point. The aperture must therefore be made large enough to accommodate the spreading effect at the focal point in order that the greater part of the light transmitted may pass through to the cell, but the blocking capacity of the aperture for stray light is thereby correspondingly reduced.

It has been proposed to employ other baffles suitably spaced between the first baffle and the lens, each being provided with an aperture proportioned to coincide with a cone generated on the optical axis of the focussed light beam, with the lens as base and the point of focus as apex. This arrangement to a great extent reduces the ingress of stray light to the cell even when it strikes the lens at a small angle to the operative beam while stray light which may pass through the lens at a considerable angle to the light beam is prevented from reaching the cell by an indirect path which previously was supplied by reflection from the inside walls of the box housing. In practice however even this arrangement has not proved entirely satisfactory, particularly under bright daylight conditions, where the small amount of daylight which manages to leak through to the cell prevents it from responding efficiently to interruptions of the light beam.

In the design of this arrangement one factor has been neglected and that is that a simple lens does not produce a true cone of light between it and the main focal point, the surface of the cone being in fact slightly concave. This inward curving of the surface is quite pronounced where simple lenses of short focal length are used and it is proposed according to the invention to take account of this fact in the design of the baffle arrangements so that the ingress of stray light will not be large enough to influence the cell under any circumstances.

According to the invention in a photo-electric detector for registering the presence of objects in the path of a light beam focussed onto a photo-electric cell by means of a lens, the light passing through the lens is confined by suitable screening to paths within the caustic surface of the lens in order that light not striking the lens parallel to its axis shall be prevented from reaching the photo-electric cell.

The invention will be better understood from the following description of one method of carrying it into effect, reference being had to the accompanying drawing which shows a diagram of the optical arrangements of a photo-electric detector receiver box.

Referring to the drawing, it will be appreciated that rays of light in a parallel beam from a light source at the other side of the roadway are focussed at point F by the simple lens 10 and pass through this point to a photo-electric cell (not shown). It will be understood that the lens and cell are accommodated in a housing which can be mechanically moved as a whole in order to obtain the most satisfactory optical position with regard to the operative light beam.

Considering now the focussing of the beam, certain imaginary rays therein have been shown in the drawing to indicate very roughly why the beam cannot be focussed to a mathematical point and in particular to indicate why a true cone of light is not formed between the lens and the focal point. The curved surface 13 actually produced is well known to those versed in the optical art as the "caustic surface" for the lens. It may be said that rays of the light beam passing along and adjacent to the optical axis 12 are concentrated to a principal focal point F whilst rays passing through points of the lens surface remote from the centre cut the axis 12 at points nearer to the lens than the point F. Certain of the rays also intersect before reaching the axis and these points of intersection form miniature focal points which together build up the caustic surface 13.

Considering now the baffle arrangements, three screens or diaphragms 14, 15 and 16 are employed, one being placed at the principal focal point F and the others 15 and 16 being spaced in the arrangement shown at equal distances between the screen 14 and the lens. Each of these screens is provided with a circular aperture of such dimensions that it coincides with the caustic surface for the lens.

The cone 11 with which the apertures in the baffles in the previously suggested arrangement were arranged to coincide has also been shown and the shaded portion between this and the caustic surface 13 may be said to represent the gain in light-baffling effect brought about by the application of the invention.

I claim:

A photoelectric detector for registering the presence of objects in the path of a light beam focussed onto a photo-tube by means of a simple lens comprising suitable screens spaced at intervals between the tube and the lens, said screens having openings whose edges define a cone, and each opening corresponding to the section of the caustic surface at the point of location of the screen, said openings defining a cone whose surfaces are curved in conformity with the curved caustic surface of the lens, said cone confining the light passing through the lens to paths within said curved caustic surface in order that light not striking the lens parallel to its axis shall be prevented from reaching the tube.

MERREL OMER WILLIAMS.